May 21, 1968
N. F. BROWN
3,384,337
LOW FRICTION SEALED AND LOW TORQUE ACTUATED
TRUNNION MOUNTED VALVE
Filed Oct. 22, 1964
2 Sheets-Sheet 1
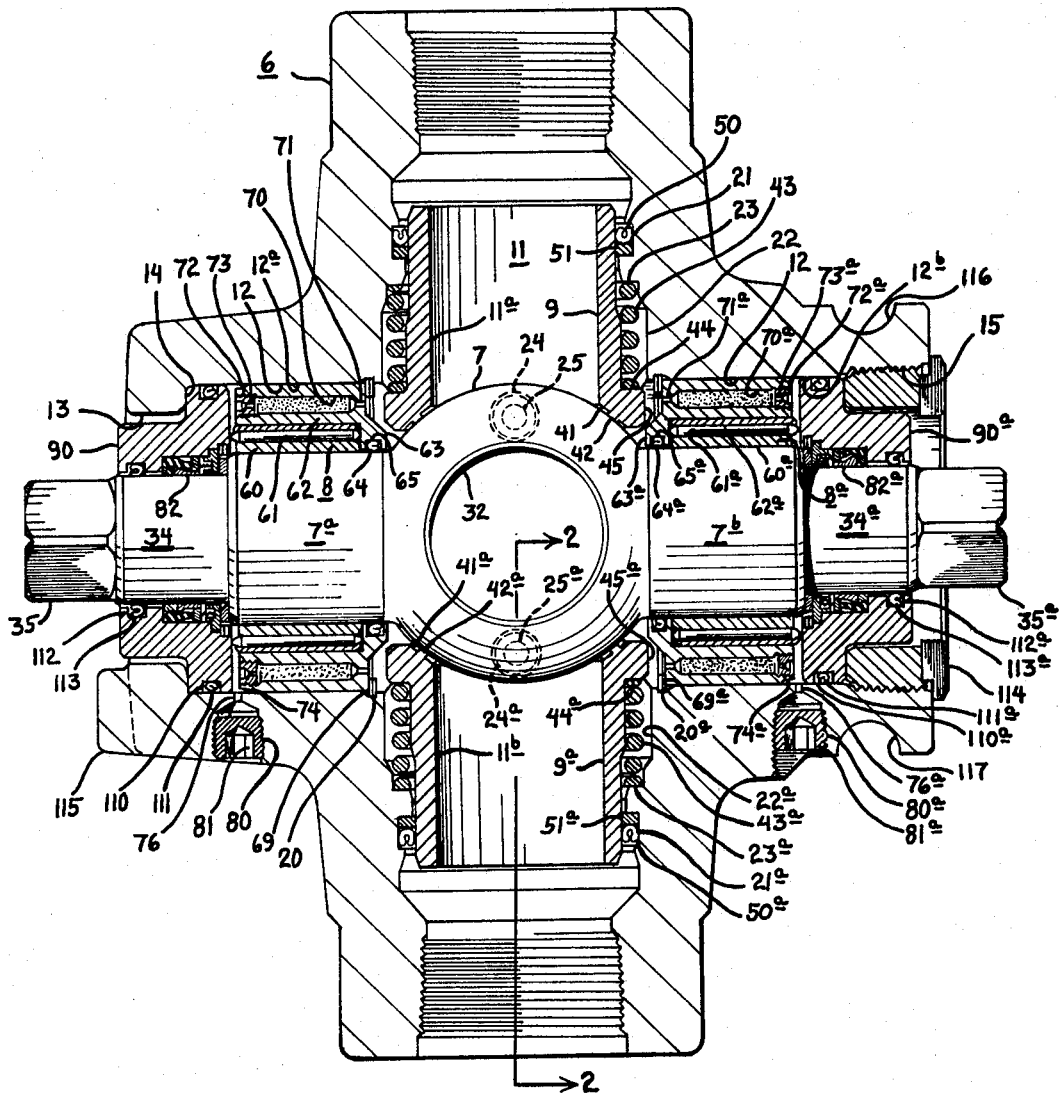
Fig-1-
INVENTOR
NORMAN F. BROWN
BY
ATTORNEYS May 21, 1968
N. F. BROWN
3,384,337
LOW FRICTION SEALED AND LOW TORQUE ACTUATED
TRUNNION MOUNTED VALVE
Filed Oct. 22, 1964
2 Sheets-Sheet 2
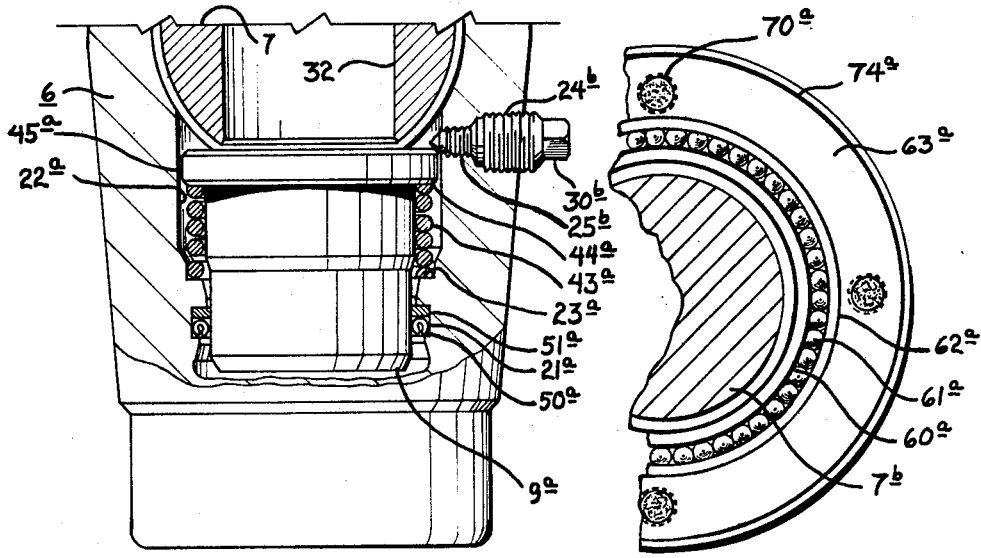
Fig-2-
Fig-5-
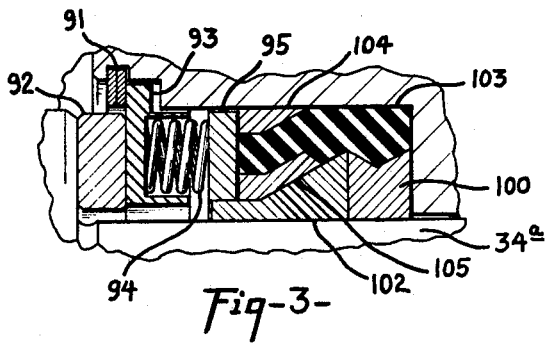
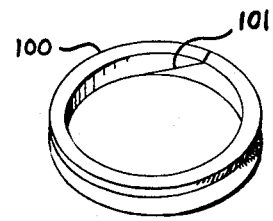
Fig-3-
Fig-4-
INVENTOR
NORMAN F. BROWN
BY
ATTORNEYS

United States Patent Office 3,384,337
Patented May 21, 1968

3,384,337
LOW FRICTION SEALED AND LOW TORQUE
ACTUATED TRUNNION MOUNTED VALVE
Norman F. Brown, Dallas, Tex., assignor to Otis Engineering Corporation, Dallas, Tex., a corporation of Delaware
Filed Oct. 22, 1964, Ser. No. 405,744
9 Claims. (Cl. 251—172)

ABSTRACT OF THE DISCLOSURE

A plug valve having seat means provided with limited minimum interface engagement of seat means with valve plug means, and low friction sealed trunnion mounts assuring low torque actuation under high pressure conditions and long service intervals.

---

This invention relates to flow control devices for controlling the flow of fluid through a conduit. More specifically this invention relates to plug type valves.

It is an object of this invention to provide a new and improved valve. It is another object of this invention to provide a plug type valve.

It is a further object of this invention to provide a plug valve wherein the valve element is spherical in shape and supported within the flow passage of the valve on trunnions.

It is an important object of this invention to provide a ball-type plug valve having a trunnion supported valve element and at least one movable seat member which may be retracted from the ball surface a sufficient distance to permit removal of the valve element from the body of the valve.

It is another object of this invention to provide a plug type valve having a valve element and pressure balanced seat members provided with a minimum seat area to permit operation of the valve under conditions of low friction so that the valve may be readily actuated with low energy expenditure at high pressures or pressure differentials.

It is another object of this invention to provide a plug type valve in which the valve element is trunnion supported and the trunnions are supported by low friction type roller bearings.

It is an additional object of this invention to provide a plug type valve having roller bearing supported trunnion members on the valve elements wherein the roller bearings function within an oil filled environment under pressure conditions existing within the principal flow passage of the valve.

It is a further object of the invention to provide a ball-type plug valve in which the various seals, bearings, and lubricating assemblies are so constructed that the valve is readily operable under substantial external liquid pressure conditions, such as when installed on the ocean floor.

It is a further object of this invention to provide an improved form of plug type valve which may be operated maintenance free, or substantially so, in inaccessible areas such as on the ocean bed for extended periods of time.

It is an important object of this invention to provide a ball-type plug valve supported on roller bearing mounted trunnions having means for maintaining lubricant around the bearings under such conditions that there will be no pressure differential existing across the lubricated bearing space and displacement of the lubricant by water thus will be prevented should the valve be utilized for water conducting service.

These and still further objects of the invention will be apparent from a reading of the following description of the invention in conjunction with the accompanying drawings.

In the drawings:

FIGURE 1 is a sectional view of a ball-type plug valve constructed in accordance with the invention, in FIGURE 1 the valve is illustrated in closed position;

FIGURE 2 is a fragmentary view, partially in section and partially in elevation along the line 2—2 of FIGURE 1, illustrating a principal advantage of the invention whereby a valve seat may be retained in retracted position to permit installation and withdrawal of the ball-type valve element;

FIGURE 3 is an enlarged view, in section, of one of the seal assemblies employed around each of the trunnions supporting the ball-type valve element;

FIGURE 4 is an isometric view in elevation of one of the principal seals utilized in the seal assembly illustrated in FIGURE 3; and FIGURE 5 is a partial view in elevation of the outward end of one of the bearings and its housing.

Referring now to the drawings, particularly FIGURE 1, the valve of the invention generally comprises a valve body 6 in which is positioned a ball-type valve element 7 having two trunnions 7a and 7b supported in the bearings 8 and 8a. The valve seats 9 and 9a cooperate with the valve element to control flow through the valve. At least one of the valve seats is movable and biased toward the valve element to permit ready removal of the valve element.

The valve body is provided with a flow passage 11 which extends through the valve body to conduct fluids through the valve. For reference purposes the flow passage will be divided into an upper portion 11a and a lower portion 11b. Also, extending through the body is a bore 12 which intersects the flow passage at an angle which will permit the valve element 7 to be introduced into and moved from the valve body. The bore 12 includes a left bore 12a and a right bore 12b. As illustrated in FIGURE 1, the bore 12a is of reduced diameter at 13 forming an internal annular shoulder 14 while the bore 12b is of uniform diameter and internally threaded at 15. The functions of both the shoulders 14 and the threads 15 will be explained hereinafter. The inward ends of the bores 12a and 12b are provided with internal annular grooves 20 and 20a, respectively, to hold a retaining ring locking the bearing housing in place, as will be later explained.

Referring back to the flow passage 11 in FIGURE 1, the body 6 adjacent the outward ends of the flow passage is provided with the internal annular grooves 21 and 21a. Inwardly from the groove 21 the flow passage 11a is enlarged at 22 providing an inwardly facing shoulder 23. The flow passage 11b is similarly provided with the enlarged portion 22a forming a shoulder 23a. Extending through the body 6 into the passage 11 and transverse thereto are the internally threaded bores 24 and 24a in which are engaged the set screws 25 and 25a and the plugs 30 and 30a.

Rotatably positioned within the valve body is the ball-shaped valve element 7 through which extends a bore or port 32 adapted to cooperate with the flow passage 11 to control flow through the valve. The valve element is supported on the trunnions 7a and 7b which are reduced in diameter at 34 and 34a. The outward ends of the trunnions are provide with the tool engageable portions 35 and 35a.

Positioned within the flow passage 11 are the valve seats 9 and 9a, both of which are moveable and retractable to permit withdrawal of the valve element 7 from the valve body through the right bore. The valve seat 9 is provided with annular arcuate surface 41 having an annular seat 42 provided by an annular flange contoured to cooperate with the outer surface of the valve element so that a substantially fluid tight relationship may be maintained between the valve seat and the valve element as the valve element is rotated and while the valve element is in either closed or open position. The valve seat is biased toward the valve element by a coil spring 43 positioned between the shoulder 23 within the flow passage 11a and a shoulder 44 formed on the valve seat by the flange 45. An external seal is provided around the valve seat within the internal surface of the valve body within the flow passage by a suitable seal ring 50 engaged with the backup ring 51, both the rings 50 and 51 being disposed within the annular groove 21 in the valve body. In the lower flow passage 11b an identical valve seat 9a is positioned. The elements and function of the lower valve seat are identical to the upper valve seat and are referred to by the same reference numerals with the subscripts a added. The valve seats and their associated elements are so sized and positioned that the valve seats are movable members biased toward the valve element and may be withdrawn a sufficient distance to permit removal of the valve element and its trunnion supports from the valve body through bore 12b.

FIGURE 2 illustrates the lower valve seat 9a in retracted position so that sufficient clearance will be provided for removal of the valve element with the valve element in open position with respect to the flow passage. The valve seat is retracted against the force of the spring 43a and the set screw 25a is rotated into engagement with the valve seat as shown in FIGURE 2, thus retaining the valve seat in its retracted position. The upper valve seat is similarly holdable in upper retracted position by a screw 25. The valve seats are retained in retracted position until the valve element is repositioned within the valve body. At this time, the set screws 25 and 25a are either withdrawn or retracted a sufficient distance to free the valve seats allowing them to move back into engagement with the external surface of the ball valve element. The bores 24 and 24a are sealed by the plugs 30 and 30a leaving the set screws 25 and 25a in place, if space and construction of the plug and set screws permit outward movement of the set screws to positions wherein they do not engage the valve seats, or removing the set screws if desired.

A particularly important feature of the invention is the low power required to turn the valve. The small force exerted between the valve seats 9 and 9a and the valve element permits free turning of the valve even under conditions of high closed-valve pressure differential across the valve elements. The diameter of the center line of the seat surfaces 42 and 42a of each valve seat is only a little less than the outside diameter of the valve seat at the seal rings 50 and 50a. Thus, the area of the back surfaces of the valve seat subject to the pressure within the flow passage is greater than the area of the seat surfaces toward the valve element exposed to such pressure with the net result that the pressure within the flow passage will urge each valve seat toward the valve element. It is preferred that the annular area between the mean diameter of the valve seat 42 and the internal diameter of the seal 50 exceed the area of the seat 42 itself by an amount ranging from about one percent to about ten percent. A still more preferred ratio for this relationship is that the annular area exceed the seat area by about five percent. In addition to the force caused by the pressure within the flow passage urging the valve seats toward the valve element, the spring unit on each valve seat also biases the valve seat toward the valve element. Since the difference in areas against which the pressure in the flow channel is effective on the valve seats is slightly greater than the area of the seat surfaces 42 and 42a, the interface unit pressure between these seat surfaces and the valve elements will always be slightly greater than the closed valve pressure differential. This seat surface area is small and therefore the friction between the seats and the valve element is small. When the valve is in open position there will be substantially no pressure differential across the valve element and the valve seats will be lightly biased toward the valve element by the force of the springs. Since the force is small the movement of the valve element would obviously require a small force. When the valve element is in closed position, as illustrated in FIGURE 1, the upper valve seat is biased toward the valve element by the force of the spring and the pressure in the flow passage acting against the area difference tending to urge the valve seat toward the valve element. At particularly high pressure levels the valve element itself will be urged downwardly toward the lower valve seat, which is also depressed due to its movable mounting. Since the lower valve seat may so deflect with the valve element, increases in friction between them are negligible even with increases in pressure in the valve in closed position. Thus, the valve may be readily rotated from a closed position with application of a low torque.

The trunnions 7 and 7a are supported within the valve body on the bearing units 8 and 8a in a manner which substantially reduces the torque necessary to actuate the valve. A further particularly desirable feature of the trunnion support system is the manner of lubrication of the bearings which provides a substantially permanent, trouble free unit. The roller bearing unit 8 comprises an inner race 60 fitted around the trunnion 7a, a plurality of rollers 61, and an outer race 62. The roller bearing unit 8, including the inner race 60, the roller 61, and the outer race 62, is positioned within a bearing housing 63. The inner race 60 forms a snug fit with the trunnion and rotates therewith. A seal 64 is positioned around the trunnion within an annular groove 65 formed within the housing 63. This seal is capable of sustaining a moderate differential pressure outwardly but will allow leakage inwardly at quite a low differential pressure.

The bearing housing is prevented from moving inwardly by a retaining ring 69 disposed in the annular groove 20 of the body 6. There is essentially a press fit between the external surface of the bearing housing and the bore so that no fluid leakage will occur along the contact area.

Formed within the housing 63 are a plurality of longitudinally oriented filter chambers or passages 70 radially positioned around the entire circumference of the housing. At the inward ends of each of the passages 70 is a portion of reduced diameter 71 opening through such end of the bearing housing. Each of the outward ends of the passages are threaded to receive a set screw 72 through which extends a small aperture 73. Each of the passageways 70 is filled with a fine, capillaried matrix such as a common felt. The valve body is provided with an external annular groove 74 which assists in distribution of a lubricant to the bearing, as will be hereinafter explained. The bearing housing and other members associated with the bearing are constructed with tolerances which, when the valve is assembled, cumulatively provide a clearance at the outward end of the bearing to facilitate distribution of lubricant to the bearing. Extending through the valve body 6 in communication with the groove 74 is a small aperture 76 which connects with an internally threaded passage 80 engageable with which is a plug element 81. Lubricant is injected into the bearing through the aperture 76 from which it flows into the groove 74 and into the clearance at the outward end of the bearing. The lubricant distributes itself through the groove and around the end of the bearing housing until it flows through the openings 73 in the screws 72 inwardly through the felt disposed within the passages 70 and further inwardly through the passages 71 into the inner portion of the valve body around the valve seats. Lubricant also flows to the rollers from the outward end of the bearing. Upon completion of injection of the lubricant the plug 81 is installed in the opening 80 to seal the lubricant in the valve. The lubricant becomes trapped in and around the bearing and will remain there since a pressure differential will not exist across the bearing area under normal operating conditions. For example, when a high pressure exists within the fluid flow passage 11, the pressure will be imposed upon all elements of the bearing by virtue of acting through the felt in the passages 70 and from there through the apertures 73 and the set screws 72. The nature of the lubricant system for the bearing taken in conjunction with the other trunnion seal assemblies 82 and 82a which will be described hereinafter is such that even when the valve is filled with water at high pressure the lubricant will not be displaced from the bearing by the water. If the valve is full of water there will be an interface at the locations where the water meets the oil. The felt material within the passages 70 functions to confine the water-oil interface within its capillaries to prevent an interchange between the water and oil. Due to the efficient seal effected by the outer seal assemblies, virtually no flow can occur through the felt within the passages and thus the oil-water interface is retained within the capillaries of the felt and the lubricant cannot be displaced. It is estimated that under such conditions a body of lubricant will remain in place within the bearing of the valve of the invention for a substantial period of time.

On the right hand side of the valve a bearing 8a supports the trunnion 7b. The right hand bearing and lubricant assembly are identical in structure and function to the left hand bearing and are denoted in the drawings by the same reference numerals with the subscript a added.

Outwardly from the bearing assemblies on the trunnions are the low friction seal assemblies 82 and 82a which are disposed about the trunnion portions 34 and 34a, respectively. The seal assemblies employed are a low friction type wherein increases in the pressure differential across the seal tend to urge the sealing element into more intimate contact with and thus more effectively seal between the trunnion portions and the body. The particular seal assembly employed here is disclosed and claimed in my co-pending United States Letters Patent application, Ser. No. 404,301 filed Oct. 16, 1964.

Referring to FIGURE 3, where the seal assembly 32a is shown in greater detail, it may be seen that the assembly is locked within the seal housing 90 by a lock ring 91 whose outer portions are received in an internal annular recess of the body. A thrust washer 92 is positioned in engagement with the shoulder formed on the end of the enlarged portion 7b of the trunnion. The thrust washer 92 is preferably formed of a low friction material such as is sold under the trademark "Teflon." Disposed around the trunnion 34a is an annular spring cage 93 in contact with the lock ring 91 and the thrust washer 92. Positioned within the spring cage are a plurality of the springs 94, which may be coil springs, to exert a force in an outward direction against a ring 95 constructed of a substantially non-resilient material such as stainless steel. Disposed in direct contact with the trunnion portion 34a is a ring 100 which, as illustrated in FIGURE 4, is scarf cut at 101 to permit the ring to more closely fit around the trunnion portion with increased pressure on the outer periphery of the ring. Also, positioned around the trunnion portion and adjacent to the ring 100 is a ring 102 formed of "Teflon" which contacts the ring 100, as shown. Disposed about and in contact with the rings 100 and 102 is a deformable ring 103 which is a semi-fluid material such as soft rubber molded in a ring having the cross-sectional configuration illustrated. Also, positioned as shown are the rings 104 and 105 which function to transmit pressure from the ring 95 to effect a deformation of the ring 103 which reacts in the nature of a fluid transmitting pressure in all directions. Since the ring 103 is confined by the rings 95, 104, and 105 and the seal housing 90, the pressure is transmitted inwardly to the rings 100 and 102 forcing them into intimate contact with the external surface of the trunnion to prevent leakage of fluids along the surface of the trunnion. Increases in the differential pressure across the seal assembly improve the contact between the trunnion and the rings 102 and 100. Ring 100 is not required to seal but it is primarily employed to prevent extrusion of the ring 102. Due to the nature of the material of which the rings are constructed, the trunnion rotates freely within them even with a substantial pressure differential across the seal assembly.

The seal assembly 82 on the left side of the valve around the trunnion 34 is identical in parts and function to the right hand seal assembly 82a, above described.

The seal housings 90 and 90a are positioned within the bore 12 outwardly of and in contact with each of the bearing assemblies on opposite sides of the valve element 7. The left seal housing 90 is positioned in contact with the internal shoulder 14 to retain the seal housing within the valve body 6. The right hand seal housing 90a is retained in the valve body by an externally threaded nut 106 engaged with the threads 15. Each of the seal housings is provided with an external static seal and an internal dynamic seal to establish sealed relationships between the valve body 6 and the trunnion portion 34, respectively. Specifically, the external surface of the seal housing 90 is provided with an annular groove 110 in which is positioned a seal ring 111 to effect a seal between the outside of the seal housing and the internal surface of the bore 12a. The internal surface of the seal housing at its outward end is provided with an internal annular groove 112 in which is fitted a ring seal 113 functioning to effect a seal between the trunnion and the seal housing to prevent invasion by external fluids such as sea water. The right hand seal housing 90a is provided with identical seals having the same reference numeral denoted by the subscript a.

The lug 115 formed on the left side of the valve body is provided for engagement with an actuator mechanism such as that disclosed in the U.S. Patent No. 3,122,351 issued Feb. 25, 1964. Tangential grooves 116 and 117 formed on the right side of the valve body permit engagement of such an actuator mechanism or other actuator for operating the valve, each having a latch mechanism to engage the grooves 116 and 117 when the mechanism is pushed into place even by a diver under water.

Assembly of the valve of the invention is carried out in the following manner. The seal assembly 82 and the seals 111 and 113 are installed in the lefthand seal housing 90. The various members of the seal assembly 82, as illustrated in FIGURE 3, including the spring cage 93 and the springs 94 are positioned within the seal housing and retained therein by the locking ring 91. The seal ring 111 is placed in the groove 110 while the seal ring 113 is placed within the internal groove 112. With the seals properly positioned within the seal housing the seal housing is inserted through the bore 12b into the bore 12a into contact with internal shoulder 14 as illustrated in FIGURE 1. The bearing assembly 8 including the inner race 60, the rollers 61, the outer race 62 and the bearing housing are placed together with the ring seal 64 being positioned within the internal groove 65 and the set screws 72 being engaged after each of the lubricant chambers 70 has been filled with the felt matrix material. Lubricant such as grease is packed in around the rollers between the races. The lefthand bearing assembly is introduced into the valve body through the right hand bore 12b and positioned in the left hand bore 12a with the end of the bearing assembly containing the set screws 72 being placed in contact with the inward end of the seal housing 90. The left hand bearing assembly is then locked in place by installation of the locking ring 69 in the groove 20. The ring seal 50 and the backup ring 51 are placed in the groove 21 of the flow channel 11a. The ring seal 50a and the backup ring 51a are than placed in the groove 21a of the lower flow passage 11b. The springs 43 and 43a along with the valve seats 9 and 9a are introduced into the valve body through the bore 12b into position within the upper and lower flow passages 11a and 11b. The springs may conveniently be placed around the valve seats prior to installation of each of the valve seats. When each of the valve seats is properly positioned it is depressed as illustrated in FIGURE 2 and a set screw, such as the set screw 25, is threadedly engaged through the valve body into contact with the inward end of the valve seat to retain the valve seat in a depressed or retracted position, as illustrated. The next part installed is the valve element 7 with the trunnions 7a and 7b. The thrust washer 92 is placed on the portion 34 of the trunnion 7a and the valve element and trunnion assembly is then introduced through the bore 12b into the valve body until the trunnion 7a is positioned within the bore 12a with the thrust washer in contact with the spring cage 93 of seal assembly 82. The introduction of the valve element and the trunnions is accomplished with the valve element being oriented such that the bore 32 through the valve element is in alignment with the flow passage 11 as shown in FIGURE 2. With the valve element and the trunnions so positioned the trunnion 7a will, of course, be within the bearing assembly 8. The set screws 25 and 25a are backed out a sufficient distance to release both of the valve seats freeing the seats so that the springs 43 and 43a may move them into engagement with the valve element. The plugs 30 and 30a are now installed in the bores 24 and 24a, respectively, to make the valve body fluid tight. The set screws 25 and 25a may be removed or left in place but backed away from the valve seat. The right hand lock ring 69a is now installed in the groove 20a in the right hand bore of the valve body. The right hand bearing assembly 8a having been assembled in the same manner as the left hand bearing assembly 8 is installed in the bore 12b around the trunnion 7b. The seal element 90a with the seal assembly 81a and the ring seals 111a and 113a in place is introduced into the right hand bore around the trunnion portion 34a with a thrust washer 92 having been placed around the trunnion against the outward end of the trunnion portion 7b. The nut 114 is now engaged with the threads 15 to securely retain the right hand bearing assembly and seal housing in place.

With the valve completely assembled as previously described lubrication of the bearings is completed prior to installation of the valve in the system in which it is to be used. While some lubricant has been packed into the roller bearing before assembly, further lubricant, such as a hydrocarbon oil, is forced into the valve body through the bores 80 and 80a until the lubricant has been forced throughout each of the bearing assemblies with the last of the air bubbles and some of the lubricant flowing through the apertures 71 and 71a into the internal portions of the valve body and preferably the space within the flow passage 11 around the valve seats is filled with lubricant. The plugs 81 and 81a are installed to seal the lubricant in place.

The valve may be readily disassembled in the event service is required. The nut 114 on the right hand side of the valve is removed followed by the seal housing and bearing assembly with their associated parts being withdrawn from the valve body in the reverse order in which assembly was accomplished. When the right hand bearing assembly and the lock ring 69a are removed from the bore 12b, a suitable tool is inserted through the bore 12b into contract with the flanges 45 and 45a of each of the valve seats 9 and 9a depressing the seats until the set screws, 25 and 25a, are rotated into engagement with the flanges to retain the valve seats in retracted position. The valve element is rotated into the position illustrated in FIGURE 2 so that the flat face's resulting from the open ends of the bore 32 will clear the flanges of the valve seats as the valve element is withdrawn. By having the valve element in the position shown it is possible to minimize the distance that the valve seats must be retracted in order to permit withdrawal of the valve element. After the valve element and the trunnions have been removed through the bore 12b, the remaining parts may be taken from the valve body in the reverse order of assembly. If only the valve element and trunnions are to be removed, the valve seats are retained in retracted position by the set screws until reassembly of the valve.

With the valve of the invention assembled and lubricated as above described, the valve is installed in the conduit of the flow system in which it is to be used. Assume for purposes of this ducussion that the upper portion of the flow passage 11a is the inlet of the valve and the lower portion or the flow pasage 11b is the outlet of the valve. The ends of the conduit in which the valve is installed are threadedly engaged into the opposite ends of the flow passage 11 with fluid flow in the conduit going into the flow passage 11a and thus exerting a pressure on the upper portion of the valve element as represented in FIGURE 1. Since the area difference between the mean diameter of the valve seat 42 and the internal diameter of the seal 50 constitutes an annular area acted upon by the upstream pressure to thrust the upper valve seat against the valve element, and since this annular area slightly exceeds that of the annular seat 42 itself, the interface unit pressure between the valve element and the seat will always slightly exceed the differential pressure shut off by the valve by a margin which is proportional to that differential pressure plus a constant derived from the spring thrust.

If the flow direction and the differential are reversed, the same is true for the other, or which ever seat is upstream.

The downstream seat member carries no load and is pressed against the valve member by the spring only. To obtain the lowest practicable requirements of torque used to operate the valve of this invention, thereby rendering it operable by remote controlled actuators very modestly powered, the spring 43 is provided with a thrust only slightly greater than that required to overcome friction at seal ring 50 and the seat biasing annular area difference is a minor excess over the valve seat area as previously discussed. The valve is readily rotated between open and closed position by engagement of any desired form of tool with the outward ends 35 or 35a of the trunnions. It may readily be seen that even when operating under such high pressures as 10,000 p.s.i. the valve is very well balanced due to the presence of the identical trunnion portions and supporting bearings on the opposite sides of the valve element. Even with high operating pressures the lubricant sealed within the bearing areas is not displaced from the bearings due to the balanced pressure conditions on opposite ends of the bearings because of the presence of the lubricant chambers 70 which have minimized a tendency toward a pressure differential across the bearings. The seals 111 and 111a around the external surfaces of the seal housing 90 and 90a are not required to be complex seals since the parts between which such seals are installed do not move relative to each other. On the other hand, the seals 82 and 82a are required to maintain a seal between movable parts and are subjected to the pressure within the valve. Where the valve is used in underwater service the seals 113 and 113a effectively exclude sea water and the like from invading the valve along the trunnion. The seals 113 and 113a, are a form of hollow O-ring with a cavity opening in the direction against which sealing action is desired thus providing a seal which is effective principally in one direction.

It will thus be seen that there is provided a plug-type valve which includes bearing supported trunnions operatively associated with a valve element which functions between seats in the main flow passage of the valve, such seats being retractable to permit the valve element to be readily removed from the body of the valve. The unique and novel construction of the valve provides a valve which may be operated with a minimum of power requirements and is particularly suited for installation in a remote location such as an ocean bottom where trouble-free service is an essential requirement. The construction of the valve seats and the means for biasing such seats toward the valve element along with the bearing mounted trunnions minimize friction during operation of the valve.

A specific example of the effectiveness of a valve constructed in accordance with the invention is one having a flow passage with a diameter of two inches and a rated working pressure of 10,000 p.s.i. Such valve when operating under a working pressure of 2,000 p.s.i. within the valve and on both sides of the valve element was found to be rotatable with a torque of less than ten foot pounds. This particular valve was closed with a pressure differential across the valve element of 10,000 p.s.i. and it was found that the valve element was rotatable from a closed to an open position with an initial torque of less than one hundred foot pounds and with the torque diminishing progressively as the valve was turned toward open position. Such valve was also operated 20,000 times with no appreciable deterioration of the sealing or change in the torque requirements.

It will be evident to those skilled in the art that various other embodiments of the valve may be constructed within the limits of the invention. While only one inlet and the one outlet have been illustrated for the valve, additional fluid flow passages intersecting the flow passage 11 may be formed in the valve body. For example, a flow passage running transverse to the flow passage 11 and having retractible valve seats installed therein would provide a four-way valve in which the valve element may readily be removed from the valve body by retraction of the valve seats. If the valve is not to be used in high pressure installations a cantilever supported valve element with only one trunnion may be employed. Numerous forms of connection between the valve element and trunnions may be used within the spirit of the invention. The trunnions may be formed integral with the valve element as illustrated or they may be separate pieces threadedly engaged to the valve element or on the other hand they may be operatively associated with the valve element but not actually secured thereto. Under certain pressure conditions it may be practical to employ a retainer nut such as the nut 114 in both the left and the right sides of the valve rather than using the internal shoulder 14 in the left side of the valve as illustrated. The dimensions of the valve may be varied to permit use of only one retractable valve seat which would allow withdrawl of the valve element from the valve body.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. A ball-type plug valve which comprises; a valve body having a flow passage extending therethrough and a bore extending into said valve body intersecting said flow passage; a ball-type valve element rotatably positioned within said flow passage and having a port cooperating with said flow passage for controlling fluid flow through said valve; a trunnion on said valve element positioned within said bore for supporting said valve element within said flow passage; seat means positioned within said flow passage to function in cooperation with said valve element for controlling flow through said flow passage, said seat means being movable away from said valve element; means for biasing said seat means toward said valve element and enabling said seat means to be retracted from said valve element to enable said valve element to be removed from and inserted into said valve body through said bore; roller bearing means positioned within said bore in engagement with said trunnion for supporting said trunnion and enabling rotation thereof; lubricant chamber means positioned around said bearing, said lubricant chamber means including communication channels at one end of said means exposing said means to the pressure within said flow passage and at the other end of said means opening into the outward end of said bearing; pressure seal means on said trunnion outwardly of said bearing and said lubricant chamber means; a plurality of cylindrical chambers circumferentially distributed around said bearing and oriented with the longitudinal axis of each of said chambers being in substantially the same direction as said trunnion; each of said chambers containing capillaried matrix material to minimize the movement therethrough of an oil-water interface; each of said chambers having an opening at one end subjecting said chambers to the pressure within said flow passage and at the other end providing communication between said chambers and the end of said bearing away from said valve element; and means including an annular groove around the housing of said bearing and an aperture through said valve body for injecting lubricant into said valve body and distributing said lubricant to said lubricant chambers.

2. A ball-type plug valve of the character set forth in claim 1, and including: a valve seat positioned within said flow passage on each side of said ball-type valve element, each said valve seat having an annular narrow projecting seat facing said valve element adapted to contact said valve element around said bore in said valve element to effect a fluid seal between said seat and said valve element around said bore in said valve element, the surfaces of said seat facing away from said valve element and exposed to the pressure within said flow passage being greater in area by a predetermined relatively small amount than the area of said annular projecting seat surface engaging said valve element and exposed to the pressure within said flow passage whereby the pressure within said passage urges said valve seat towards said valve element with a force sufficient to maintain said projecting seat surface in low torque seating engagement with said valve element; a spring around each of said valve seats engaged between said seat and said valve body biasing said seat toward said valve element and enabling said seat to be retracted from said valve element a distance sufficient to enable said valve element to be removed from and introduced into said valve body through said bore.

3. A plug valve in accordance with claim 1 wherein the cross-sectional area of the pressure surface of said seat means exceeds the area of the projecting seat face of the seat means contacting the valve means by an amount of about five percent.

4. A plug valve in accordance with claim 2 wherein the cross-sectional area of the pressure area of said valve seat means exceeds the area of the projecting seat face of the seat means which contacts the valve means by an amount ranging from about one to about ten percent.

5. A ball-type plug valve in accordance with claim 2 wherein said pressure area surface on said seat means facing away from said valve means is greater in area than said conical projecting seat surface by an amount of about five percent.

6. A ball-type plug valve comprising in combination; a valve body provided with a fluid flow passage extending therethrough and a bore extending therethrough intersecting said flow passage and oriented substantially transverse to said flow passage; a ball-type valve element movably positioned within said fluid flow passage, said valve element having a bore therethrough to cooperate with said fluid flow passage to control fluid flow through said valve; a trunnion extending from opposite sides of said valve element into said bore to support said valve element in said flow passage; a roller bearing positioned around each of said trunnions within said bore on either side of said valve element to rotatably support said trunnions within said bore; a bearing housing around and supporting each of said roller bearings within said bore, said bearing housing being provided with a plurality of cylindrical lubricant chambers oriented longitudinally along the length of said bearing housing and having openings extending through either end of the said bearing housing to subject the inward ends of each of said lubricant chambers to the pressure within said fluid flow passage in said valve body and to effect fluid communication with the outward ends of said chambers and the outward end of said roller bearing; a capillaried matrix material within each said lubricant chamber to minimize the movement of lubricant through said chambers; said bearing housings and said valve body being provided with a channel and a port, respectively, to allow injection of lubricant into said lubricant chambers from outside of said valve body; a bearing retainer around each of said trunnions outward of each of said roller bearings to retain said roller bearings in position within said valve body on said trunnions; a low friction type internal seal assembly having a fluid material capable of plastic flow confined therein positioned around each trunnion within said bearing retaining elements to effect a fluid seal around each of said trunnions outwardly of said roller bearings; an external fluid seal around each said bearing retaining element forming a seal with said bore in said valve body; and a member formed on the outer end of at least one of said trunnions for rotating said trunnions and said valve element within said valve body.

7. A ball-type plug valve which comprises: a valve body provided with a flow passage extending therethrough forming an inlet and an outlet for said valve, said flow passage having formed therein an enlarged portion in both said inlet portion and said outlet portion providing an inwardly facing shoulder in each of said portions and an internal annular groove formed at opposite ends of each of said portions to receive fluid seal elements, said body being further provided with a bore extending therethrough substantially transverse to and intersecting said flow passage, the portion of said bore on one side of said flow passage being of reduced diameter at the outward end thereof forming therein an inwardly facing shoulder, the portion of said bore on the other side of said flow passage being substantially uniform in diameter, said bore having an internal annular groove toward the inward end of each of said portions to receive a locking ring; a spherical shaped valve element rotatably positioned within said flow passage, said valve element having a bore therethrough adapted to cooperate with said flow passage and when in alignment with said passage to allow fluid flow through said passage and when positioned transverse to said passage to prevent fluid flow through said channel; a trunnion on each side of said valve element, each of said trunnions having an inner portion, a middle portion of lesser diameter than said inner portion, and an outer portion adapted to be engaged by a valve actuating tool, said trunnions each being positioned in one of said bore portions on opposite sides of said flow channel; a roller bearing positioned on each of said inner portions of said trunnions within each of said portions of said bore for rotatably supporting said trunnions and said valve element within said flow channel; a locking ring positioned at the inward end of each bore portion to limit the inward movement of each bearing; a bearing housing around each of said roller bearings in each of the portions of said bore, said bearing housing having formed therein a plurality of lubricant chambers radially positioned around said housing and oriented longitudinally along the length of said housing, said chambers having fluid apertures opening through opposite ends thereof and containing therein a capillaried matrix material; said bearing housing having an external channel to facilitate distribution of lubricant around and into said bearing housing; a screw having an aperture therethrough engaged in the outward end of each of said lubricant chambers; said valve body having openings extending into said flow channels around said bearing housing for introducing lubricant into said valve body; a plug element engageable in each of said openings leading into said valve body; a seal housing around each middle portion of each trunnion in engagement with the outward end of the bearing on said inner portion of said trunnion; an outer ring seal around each seal housing to form a seal between the outer surface of each housing and the inner surface of each portion of the bore; an inner seal within each seal housing near the outward end thereof adapted to prevent inward fluid flow from without said valve body along the intermediate portion of each trunnion; a low friction, high pressure, inner seal within each seal housing outward from the end of each bearing; an internally threaded nut engaged within said bore restraining one of said seal housings within one portion of said bore while the other of said seal housings is engaged on the other side of said valve body with the internal shoulder within the other portion of said bore; a hollow, cylindrical shaped, valve seat positioned in each of the inlet and outlet portions of said flow passage on opposite sides of said valve element; each of said valve seats having an outwardly extending shoulder around the inward end thereof, and a seat face of arcuate annular shape projecting from each of said valve seats to contact said valve element around the bore in said element to control fluid flow through said flow passage and said bore, each said projecting valve seat face also having means providing a pressure area surface facing away from said valve element and exposed to pressure in said passage of said body whereby said arcuate seat face is biased into seating engagement with said valve element by said pressure acting on said area, said pressure surface being larger in area than said area of said seat face whereby pressure within said flow passage urges each of said valve seats toward said valve element with a low torque force to maintain the seat face in engagement with said valve element and permit low torque movement of said valve element relative to said seat face; a spring around each of said valve seats restrained between said shoulder around the outside of said seat and the inwardly facing internal shoulder within the body in each portion of said flow channel to bias said seat toward said valve element; seal elements around each said seat within the slot provided in each portion of said flow channel to prevent fluid flow within said channel along the external surfaces of said seat; means engaged through said valve body to contact the inward end of each said seat for locking each seat in a retracted position to allow said valve element to be withdrawn from said valve body through said bore; and the shoulders around each said valve seat and within each portion of said flow channel being a sufficient distance apart and said springs around each of said seats being sufficiently resilient to enable each said seat to be retracted from said valve element a distance sufficient to permit installation and removal of said valve element through said bore.

8. A ball-type plug valve in accordance with claim 7 wherein the area of said pressure area surface exceeds the area of said projecting seat face by an amount which is in the range of about one to about ten percent in excess of the area of said arcuate annular seat face on said valve seat.

9. A ball-type plug valve in accordance with claim 7 wherein the area of said pressure area surface exceeds the area of said projecting annular arcuate seat face by an amount which is about five percent in excess of the area of said arcuate annular seat face on said valve seat.

References Cited

UNITED STATES PATENTS

| | | | |
|---|---|---|---|
| 2,191,232 | 2/1940 | Heinen | 251—174 |
| 2,799,470 | 8/1957 | Margrave | 251—172 |
| 2,866,213 | 12/1958 | McArthur | 251—172 X |
| 3,132,837 | 5/1964 | Britton | 251—172 |
| 3,171,429 | 3/1965 | Sturmer | 251—163 X |
| 3,209,778 | 10/1965 | Flohr | 251—170 X |
| 3,214,131 | 10/1965 | Boldt | 251—170 |

FOREIGN PATENTS

| | | |
|---|---|---|
| 655,078 | 7/1951 | Great Britain. |
| 1,102,510 | 3/1961 | Germany. |

CLARENCE R. GORDON, *Primary Examiner.*